UNITED STATES PATENT OFFICE.

HARRY S. MORK, OF BOSTON, MASSACHUSETTS, ASSIGNOR TO CHEMICAL PRODUCTS COMPANY, OF BOSTON, MASSACHUSETTS, A CORPORATION OF MAINE.

CELLULOSE ESTER AND PROCESS OF TREATING SAME.

972,464.  Specification of Letters Patent.  Patented Oct. 11, 1910.

No Drawing.  Application filed May 6, 1910. Serial No. 559,728.

*To all whom it may concern:*

Be it known that I, HARRY S. MORK, of Boston, in the county of Suffolk and State of Massachusetts, have invented an Improvement in Cellulose Esters and Processes of Treating Same, of which the following is a specification.

This invention relates to improvements in cellulose esters of the fatty acids, as cellulose acetate, and particularly to the dissolving or gelatinizing of these esters by new solvents. For many purposes it is desirable to use a solvent of the ester from which the solvent will evaporate rapidly, and, in case it is not practical to recover the solvent, the solution must contain a considerable amount of the ester dissolved in it in order to be economical of solvent; as, for example, a solution for coating and insulating fine wire used in the electrical art, or a solution for coating paper.

Heretofore, acetone and chloroform, or mixtures of chloroform with relatively small percentages of methyl or ethyl alcohol, have been the only available highly volatile solvents for cellulose acetate. Acetone is not a satisfactory solvent for producing concentrated solutions of that quality of cellulose acetate such as will make tough and flexible films. Chloroform and mixtures of chloroform with methyl or ethyl alcohol dissolve such cellulose acetate readily, and by either of these solvents a solution containing a considerable quantity of cellulose acetate can be obtained; but the high cost of chloroform and its anesthetic properties prohibit its general use. Formic acid will also dissolve cellulose acetate; and methyl alcohol, in mixtures with other solvents of cellulose acetate, such as acetylene tetrachlorid or chloroform, has a latent solvent power for cellulose acetate, although alone it is a non-solvent.

Now, I have discovered that methyl formate, a highly volatile liquid boiling at about 32° C., which is the ester formed by the condensation of methyl alcohol and formic acid with the elimination of water, is also a very excellent solvent for cellulose acetate, and with it solutions of cellulose acetate can be made of a concentration comparable with those produced with chloroform; for example, cellulose acetate of a quality from which can be produced tough films can be easily dissolved in methyl formate in the proportion of at least twenty-four ounces of cellulose acetate to one gallon of methyl formate. Methyl formate is a much more powerful solvent for cellulose acetate than acetone, and it has distinct advantages over chloroform. It is not necessary for all purposes that methyl formate be used alone as a solvent for the cellulose acetate, for it may be desirable to regulate or modify the rate of evaporation of the solvent, and this may be done by adding to the methyl formate a less volatile solvent for the cellulose acetate, such as acetylene tetrachlorid or phenol. To solutions of cellulose acetate in methyl formate can be added limited quantities of liquids which are non-solvents of cellulose acetate; as, for example, benzol, or carbon tetrachlorid, such non-solvents also acting to modify the rate of evaporation and also serving as diluents.

I claim:

1. The method herein described of changing the physical condition of cellulose esters of the fatty acids, as cellulose acetate, which consists in dissolving such esters in methyl formate, and then adding to the solution another solvent of the ester.

2. The method herein described of changing the physical condition of cellulose esters of the fatty acids, as cellulose acetate, which consists in dissolving such esters in methyl formate, and then adding to the solvent a liquid which is a non-solvent of the ester.

3. The method herein described of changing the physical condition of cellulose esters of the fatty acids, as cellulose acetate, which consists in dissolving such esters in methyl formate and another solvent, and then adding to the solution a liquid which is a non-solvent of the ester.

4. A composition of matter consisting of a cellulose ester of a fatty acid, as cellulose acetate, dissolved in methyl formate.

5. A composition of matter consisting of a cellulose ester of a fatty acid, as cellulose acetate, dissolved in methyl formate and another solvent.

6. A composition of matter consisting of a cellulose ester of a fatty acid, as cellulose acetate, dissolved in methyl formate and having another solvent for the ester added to the solution.

7. A composition of matter consisting of a cellulose ester of a fatty acid, as cellulose acetate, dissolved in methyl formate, and a liquid added to the solution which is a non-solvent for the ester.

8. A composition of matter consisting of a cellulose ester of a fatty acid, as cellulose acetate, dissolved in methyl formate and another solvent, and a liquid added to the solution which is a non-solvent for the ester.

9. A solvent for the cellulose esters of the fatty acids, as cellulose acetate, consisting of methyl formate and another solvent.

In testimony whereof, I have signed my name to this specification, in the presence of two subscribing witnesses.

HARRY S. MORK.

Witnesses:
 B. J. NOYES,
 H. B. DAVIS.